US008103302B2

(12) United States Patent
Haartsen et al.

(10) Patent No.: US 8,103,302 B2
(45) Date of Patent: Jan. 24, 2012

(54) POWER-AWARE LINK ADAPTATION WITH VARIABLE BANDWIDTH ALLOCATION

(75) Inventors: Jacobus Cornelis Haartsen, Hardenberg (NL); Bengt Lindoff, Bjärred (SE); Anders Wallén, Eslöv (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 1169 days.

(21) Appl. No.: 11/853,068

(22) Filed: Sep. 11, 2007

(65) Prior Publication Data

US 2009/0069057 A1 Mar. 12, 2009

(51) Int. Cl.
*H04B 7/00* (2006.01)
(52) U.S. Cl. ........... 455/522; 455/69; 455/450; 455/464
(58) Field of Classification Search .................. 455/522, 455/67.11, 68–70, 127.1, 127.5, 574, 343.5, 455/450, 451, 452.1, 464, 509, 516, 517; 370/318, 236.1, 395.41, 332; 375/E7.141
See application file for complete search history.

(56) References Cited

U.S. PATENT DOCUMENTS

| | | | |
|---|---|---|---|
| 5,491,832 A | 2/1996 | Malkamaki et al. | |
| 5,642,384 A | 6/1997 | Ramesh | |
| 6,473,506 B1 * | 10/2002 | Hook et al. | 379/279 |
| 6,603,751 B1 * | 8/2003 | Odenwalder | 370/331 |
| 6,985,538 B2 | 1/2006 | Murakami et al. | |
| 7,356,346 B2 * | 4/2008 | Gopalakrishnan et al. | 455/512 |
| 2002/0177446 A1 | 11/2002 | Bugeja et al. | |
| 2003/0022683 A1 * | 1/2003 | Beckmann et al. | 455/518 |
| 2003/0088797 A1 | 5/2003 | Gaur | |
| 2004/0022218 A1 * | 2/2004 | Kim et al. | 370/335 |
| 2005/0113120 A1 * | 5/2005 | Rappaport et al. | 455/500 |
| 2005/0128976 A1 * | 6/2005 | Uehara et al. | 370/329 |
| 2005/0215265 A1 * | 9/2005 | Sharma | 455/453 |
| 2006/0031429 A1 * | 2/2006 | Ayyagari | 709/220 |

(Continued)

FOREIGN PATENT DOCUMENTS

EP    0 907 296    4/1999

(Continued)

OTHER PUBLICATIONS

Kaemarungsi et al., "On the Use of Adaptive OFDM to Preserve Energy in Ad Hoc Wireless Networks," Proceedings of 13th MPRG/Virginia Tech Symposium on Wireless Personal Communications, Jun. 2003, pp. 1-12, retrieved from the Internet: http://www.scalable-networks.com/pdf/MPRG_May03_Kamol.pdf.

(Continued)

*Primary Examiner* — Dominic E Rego
(74) *Attorney, Agent, or Firm* — Coats & Bennett, P.L.L.C.

(57) ABSTRACT

Methods and apparatus are disclosed for reducing mobile terminal energy consumption during data transmissions by allocating resources and adapting link parameters in an energy-aware manner, based on throughput requirements and prevailing signal propagation conditions. A combination of transmit parameters designed to minimize the total energy consumed during data transmission is selected based on a throughput requirement and a path loss associated with a data transmission by a mobile terminal. The combination of transmit parameters includes a bandwidth allocation and may also include a modulation format, coding scheme, and transmit power setting, as well as parameters relating to multiple-antenna transmit schemes. The bandwidth allocation may correspond to a number of sub-carriers of an OFDM signal, or may correspond to a number of resource blocks in an SC-FDMA signal.

22 Claims, 4 Drawing Sheets

U.S. PATENT DOCUMENTS

| | | | |
|---|---|---|---|
| 2006/0039333 A1* | 2/2006 | Pirzada et al. | 370/338 |
| 2006/0057978 A1 | 3/2006 | Love et al. | |
| 2006/0063554 A1* | 3/2006 | Scharf-Katz et al. | 455/522 |
| 2006/0109931 A1* | 5/2006 | Asai et al. | 375/299 |
| 2006/0240834 A1* | 10/2006 | Sawaya et al. | 455/446 |
| 2007/0086367 A1* | 4/2007 | Sung et al. | 370/278 |
| 2007/0189235 A1 | 8/2007 | Chandra et al. | |
| 2007/0189404 A1* | 8/2007 | Baum et al. | 375/260 |
| 2007/0217339 A1* | 9/2007 | Zhao | 370/252 |
| 2007/0242621 A1* | 10/2007 | Nandagopalan et al. | 370/254 |
| 2008/0009243 A1* | 1/2008 | Hart | 455/67.13 |
| 2008/0146154 A1* | 6/2008 | Claussen et al. | 455/63.1 |
| 2010/0111027 A1* | 5/2010 | Hart | 370/329 |
| 2011/0103363 A1* | 5/2011 | Bennett | 370/338 |

FOREIGN PATENT DOCUMENTS

| | | |
|---|---|---|
| EP | 1 473 885 | 11/2004 |
| EP | 1 760 908 | 3/2007 |
| WO | 2006/044901 | 4/2006 |
| WO | 2006/077141 | 7/2006 |

OTHER PUBLICATIONS

Zhu et al., "A Power Efficient Adaptive Modulation Scheme over Fading Channel," IEEE International Conference on Communications, Circuits and Systems and West Sino Expositions, Jun. 29-Jul. 2, 2002, pp. 257-261, IEEE, Piscataway, NJ, US.

De La Kethulle De Ryhove, Sebastian et al. "A Design Methodology for Link Adaptation Schemes using Constellation of Constant PAPR." IEEE Conference on Communications, 2006 (ICC '06). vol. 9, pp. 4321-4326.

Jayanthi, K. et al. "A Link Adaptive Power Control Scheme for Wideband CDMA System." 2005 IEEE 7th Malaysia International Conference on Communication Networks. Nov. 16-18, 2005. vol. 2, pp. 833-837.

Lilja, Harri et al. "WCDMA Uplink Modulation Scheme Evolution and Transmitter Implementation." IEEE 50th Vehicular Technology Conference. VTC 1999—Fall. vol. 2, pp. 899-903.

Tang, Fei et al. "Optimization of Link Adaptation with a Practical Power Consumption Model." IEEE 57th Semiannual Vehicular Technology Conference. VTC 2003—Spring. vol. 2, pp. 1340-1344.

Yang, Kai et al. "Battery-Aware Adaptive Modulation with QoS Constraints." IEEE Transactions on Communications. vol. 54, No. 10, Oct. 2006, pp. 1797-1805.

Qiao, D. et al. "Adaptive Transmit Power Control in IEEE 802.11a Wireless LANs." In Proceedings of IEEE (VTC 2003-Spring), Jeju, Korea, Apr. 22-25, 2003, pp. 433-437.

Qiao, D. et al. "Energy-Efficient PCF Operation in IEEE 802.11a WLANs via Transmit Power Control." Computer Networks (Elsevier), vol. 42, No. 1, May 2003, pp. 39-54.

3GPP TR 25.814 V7.1.0(Sep. 2006). 3rd Generation Partnership Project; Technical Specification Group Radio Access Network; Physical layer aspects for evolved Universal Terrestrial Radio Access (UTRA) (Release 7). pp. 87-90.

Myung, H. et al. "Single Carrier FDMA for Uplink Wireless Transmission." IEEE Vehicular Technology Magazine, Sep. 2006, pp. 30-38.

\* cited by examiner

POWER-AWARE LINK ADAPTATION WITH VARIABLE BANDWIDTH ALLOCATION

BACKGROUND

1. Technical Field

The present invention generally relates to methods and apparatus for adapting transmit parameters to radio conditions in a wireless communications system, and particularly relates to adapting mobile terminal transmit parameters, including the bandwidth of the transmitted signal, in order to reduce the energy consumption and extend the battery life of the mobile terminal.

2. Background

The $3^{rd}$ Generation Partnership Project (3GPP) is currently developing specifications for new wireless communications systems as part of its "Long Term Evolution" (LTE) initiative. The goals of LTE include very high peak data rates (up to 100 Mbps on the downlink; up to 50 Mbps on the uplink) for mobile users. In order to achieve these goals, LTE as currently planned employs advanced multiple access schemes, adaptive modulation and coding schemes, and advanced multi-antenna technologies.

In particular, 3GPP has selected single carrier frequency division multiple access (SC-FDMA) technology for the LTE uplink (transmissions from a mobile terminal to a base terminal). Although similar in many respects to orthogonal frequency division multiple access (OFDMA) technology, SC-FDMA signals offer a reduced peak-to-average power ratio (PAPR) compared to OFDMA signals, thus allowing transmitter power amplifiers to be operated more efficiently. This in turn facilitates more efficient usage of a mobile terminal's limited battery resources. (SC-FDMA is described more fully in Myung, et al., "Single Carrier FDMA for Uplink Wireless Transmission," *IEEE Vehicular Technology Magazine*, vol. 1, no. 3, Sep. 2006, pp. 30-38.)

LTE resource blocks are defined as time-frequency blocks with a duration of 0.5 milliseconds (one slot, or half a sub-frame) and encompassing a bandwidth of 180 kHz (corresponding to 12 sub-carriers with a spacing of 15 kHz). The exact definition, for example the duration and bandwidth of a resource block, may vary within LTE and similar systems, and the invention is not limited to the numbers used herein. Resource blocks may be dynamically assigned to mobile terminals, and may be assigned independently for the uplink (reverse link) and the downlink (forward link). Depending on a mobile terminal's requirements, the system resources allocated to it may be increased by allocating resource blocks across several sub-frames, or across several frequency blocks, or both. Thus, the instantaneous bandwidth allocated to a mobile terminal transmitter in a scheduling process may be dynamically adapted to respond to changing conditions.

In addition, LTE also employs multiple modulation formats (including at least QPSK, 16-QAM, and 64-QAM), as well as advanced coding techniques, so that maximum throughput can be achieved over a variety of signal conditions. Depending on the signal conditions and the desired data rate, a suitable combination of modulation format, coding scheme, and bandwidth is chosen, generally to maximize the system throughput. Power control is also employed to ensure acceptable bit error rates while minimizing interference between cells.

Although SC-FDMA was selected as the LTE uplink multiple access scheme at least partly to facilitate more efficient use of mobile terminal battery resources, the allocation of link resources and selection of transmit parameters such as modulation format, coding scheme, and transmit power level is generally performed so as to maximize the overall system throughput, perhaps while maintaining a certain quality of service (QoS) for each mobile terminal. Maximum system throughput, however, will not generally coincide with maximum efficiency (i.e. lowest overall energy consumption) at the mobile terminal. Past experience has shown that lower energy consumption, which translates directly into longer battery life between charges, is a key criterion in ensuring consumer satisfaction with mobile devices.

SUMMARY

The present invention provides methods and apparatus for reducing mobile terminal energy consumption during data transmissions by allocating link resources and adapting link parameters in an energy-aware manner, based on throughput requirements and prevailing signal propagation conditions. The methods described are particularly useful in lightly loaded networks where underutilized system capacity can be exchanged for improved energy consumption, and hence improved battery life, in mobile terminals.

In one exemplary embodiment, a mobile terminal selects transmit parameters designed to minimize the total energy consumed during data transmission by determining a throughput requirement and a path loss associated with the data transmission and selecting, based on the throughput requirement and the path loss, a combination of transmit parameters including a bandwidth allocation. The combination of transmit parameters may also include a modulation format, coding scheme, and transmit power setting, as well as parameters relating to a multi-antenna transmission scheme. The bandwidth allocation may correspond to a number of sub-carriers of an OFDM signal, or may correspond to a number of resource blocks in an SC-FDMA signal.

In one or more embodiments, a mobile terminal sends a request for resource allocation to a base station. The contents of this request are based on the selected transmit parameters. In response, the base station determines a schedule for allocation of resources to the mobile terminal, and sends a message indicating the allocated resources.

In another embodiment, a network node in a wireless communications system, such as a Node B in an LTE system, receives throughput requirement information and path loss information from a mobile terminal. The network node uses that information to select a combination of transmit parameters for the mobile terminal, including a bandwidth allocation, the parameters again designed to minimize energy consumption by the mobile terminal transmitter. The network node may also use resource requirements associated with one or more other mobile terminals to select the combination of transmit parameters.

DETAILED DESCRIPTION

The present invention provides methods and apparatus for reducing mobile terminal energy consumption during data transmissions. The methods described are particularly useful in lightly loaded networks where underutilized system capacity can be exchanged for improved energy consumption, and hence improved battery life, in mobile terminals. Although the following description illustrates the present invention as applied to an LTE system employing SC-FDMA technology, the techniques of the present invention may also be applied to other wireless communications systems where bandwidth is dynamically allocable to mobile or fixed transmitters. In particular, although the techniques of the present invention are described below in the context of a mobile terminal communicating with a fixed base station, these techniques may also be applied to mobile-to-mobile links, such as in an ad-hoc network or relay scenario.

Figure 1:
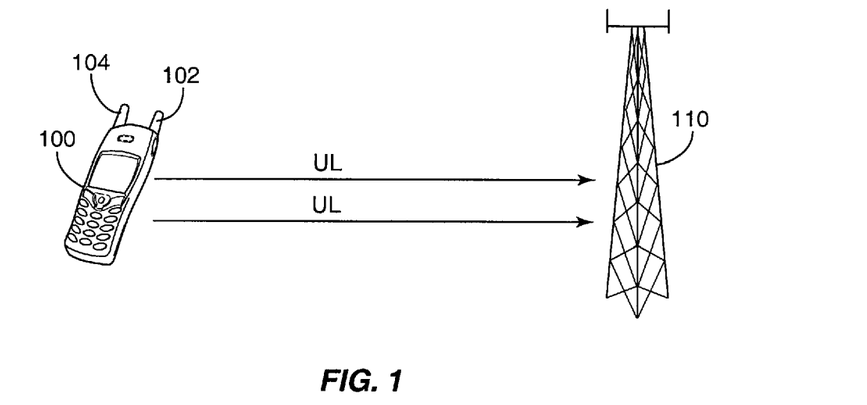
FIG. 1 is a block diagram of one embodiment of a wireless communications system.

FIG. 1 illustrates a mobile terminal 100 and a base station 110 in an LTE wireless communications system. The mobile terminal 100 transmits voice and other signals to the base station 110 over one or more uplink (UL) channels. The mobile station 100 also receives voice and other signals from the base station 110 over one or more downlink channels (not shown). In the exemplary embodiment pictured in FIG. 1, the mobile terminal 100 includes two antennas 102 and 104, which may be employed for transmit diversity, including advanced multiple-input-multiple-output (MIMO) schemes, receive diversity, or both.

As currently defined by 3GPP, the uplink of an LTE system employs single carrier frequency division multiple access (SC-FDMA) technology. SC-FDMA is similar to Orthogonal Frequency Division Multiple Access (OFDMA), but has several characteristics that make it more suitable for a mobile transmitter. In particular, a typical SC-FDMA signal exhibits a lower Peak-to-Average-Power Ratio (PAPR) than seen with OFDMA. This allows the power amplifier to be utilized more efficiently.

Figure 2:
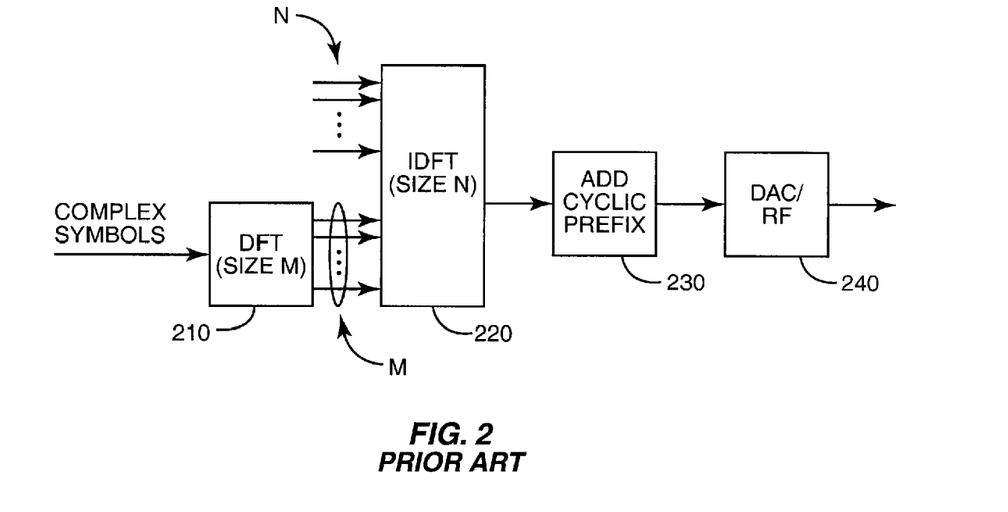
FIG. 2 is a block diagram for an SC-FDMA transmitter.

FIG. 2 depicts the basic functional blocks in a SC-FDMA transmitter. Those skilled in the art will immediately recognize the similarity to an OFDM transmitter. Complex symbols according to one or more of several modulation schemes, including BPSK, QPSK, 8-PSK, and 16-QAM, are processed at block 210 using a size-M discrete Fourier transform (DFT). (In LTE systems, QPSK and 16-QAM modulations are supported. However, higher-order modulation formats, e.g. M-PSK and M-QAM, may also be used in SC-FDMA systems.) Each group of M symbols is transformed by block 210 to produce a frequency-domain representation of the symbols. Each of the M DFT outputs are mapped to one of the N orthogonal sub-carriers that can be transmitted. (N is typically much larger than M.) As with OFDMA, an N-point inverse DFT (IDFT) is performed, at block 220, to transform the sub-carrier amplitudes to a time-domain sequence. After inserting a cyclic prefix, at block 230, to reduce inter-symbol interference from multipath distortion, the resulting time-domain sequence is converted to an analog signal and used to modulate a single radio frequency carrier using the digital-analog-converter (DAC) circuitry and RF circuitry pictured at block 240.

SC-FDMA is sometimes referred to as pre-coded OFDM, since the generation of the transmitted signal resembles OFDM modulation. The primary difference is the application of an M-size DFT (block 210) before an N-size IDFT is applied (block 220); with OFDM the complex symbols are mapped directly to the N orthogonal sub-carriers. Since N>M, the DFT and IDFT do not cancel each other. Instead, the complex frequency-domain symbols are mapped to a subset of the N available sub-carriers.

One benefit of this approach is that the uplink signal may be easily positioned at an arbitrary position within the transmission bandwidth of N×Δf, where Δf is the sub-carrier spacing, occupying M×Δf of that transmission bandwidth. (In LTE, the normal sub-carrier spacing is 15 kHz.) Another benefit is that the amount of bandwidth allocated to a particular user is flexible, and can be adjusted dynamically. (Note that these benefits apply to both SC-FDMA and OFDMA signals.)

Figure 3:
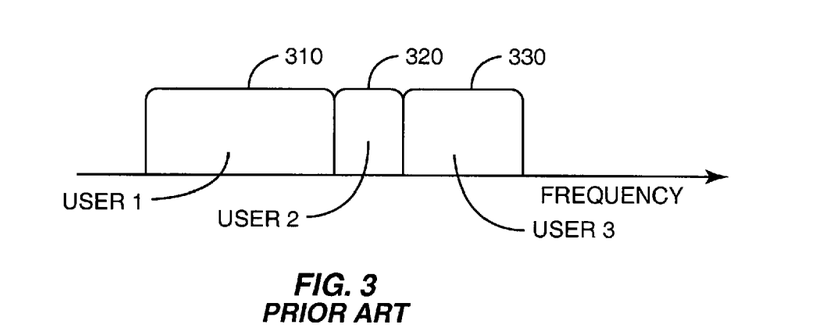
FIG. 3 illustrates an allocation of frequency between users in an SC-FDMA signal.

In LTE, uplink frequency is allocated in "resource blocks." A resource block is defined as a time-frequency block with a duration of 0.5 milliseconds (corresponding to one slot or half a sub-frame) and encompassing a bandwidth of 180 kHz. Thus, resource allocation to a single terminal or user equipment (UE) can be increased by stacking resource blocks in time (the total duration becomes a multiple of the sub-frame duration) and/or in frequency (the total bandwidth allocation becomes a multiple of 180 kHz). FIG. 3 illustrates frequency allocation between 3 users; frequency allocation 310, assigned to user 1, is considerably larger than allocation 320 or allocation 330, assigned to user 2 and user 3, respectively. This difference in frequency allocation may simply reflect differences in data throughput requirements, but may also, as will be demonstrated below, be varied under certain circumstances so as to reduce the energy consumed by a mobile transmitter.

The input to DFT 210 consists of the coded modulation symbols. Supported modulation formats in LTE uplink include QPSK, and 16-QAM; 64-QAM is planned for the future. Coding, such as turbo coding may be applied before the DFT; a variety of coding schemes and/or rates may be used, as will readily be understood by those skilled in the art.

Just as bandwidth may be dynamically allocated to a user's mobile terminal, modulation formats and coding schemes may be adjusted dynamically, in response to changing user requirements and changing signal propagation conditions. In addition, the mobile terminal's transmit power level is adjusted to ensure acceptable received signal strength at the base station 110, given the signal propagation conditions and the selected modulation format and coding schemes, while minimizing inter-cell interference.

Although not currently included in the LTE uplink, MIMO technology might also be employed. In this case, mobile terminal 100 utilizes two or more antennas (such as antennas 102 and 104) for uplink transmissions. Thus, parameters defining the appropriate pre-coding, spatial multiplexing, and/or diversity coding techniques must be established for the mobile terminal transmitter.

Thus, transmit parameters that may be selected for a particular transmission by mobile terminal 100 include the bandwidth allocation, transmit power level, modulation format and coding scheme, and MIMO-related parameters. Any or all of these might be adjusted on a sub-frame by sub-frame basis, or less frequently. On the other hand, one or more of these parameters may remain constant while others vary, perhaps for the duration of a bulk data transfer, or even for the duration of a phone call.

Each of these parameters has an effect, either directly or indirectly, upon the energy consumed by the mobile terminal during a data transmission. While conventional approaches for allocating bandwidth and selecting modulation format, coding schemes, and transmit power level are designed to maximize network throughput, conventional approaches do not adequately take into account the power and energy consumption of the mobile terminal.

Figure 4:
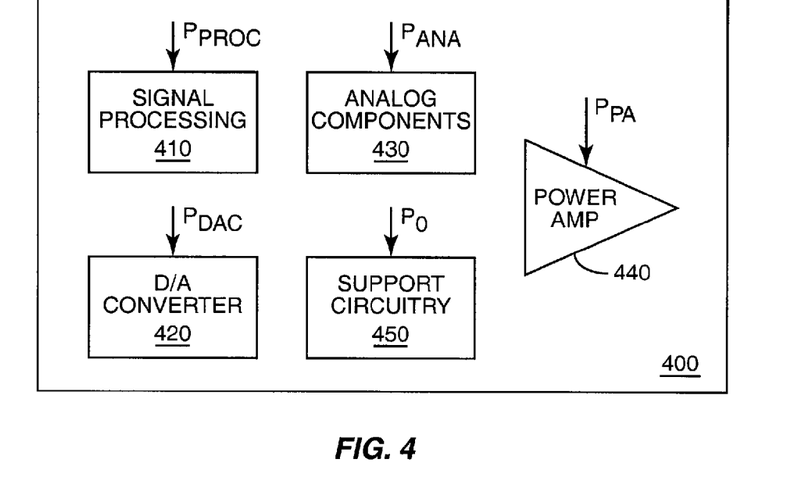
FIG. 4 is a block diagram illustrating one embodiment of a transmitter.

FIG. 4 illustrates another functional representation of an SC-FDMA transmitter 400, such as might be contained in mobile terminal 100. Symbols to be transmitted are produced in signal processing block 410, and pass through the digital-to-analog converter (DAC) 420, analog conditioning block 430, and power amplifier 440 before transmission to the base station 110. Support circuitry 450 may comprise clocks, local oscillators, power converters, etc. The power consumed by these functional blocks will vary during data transmission, depending on the transmit parameters discussed above. In addition, the total energy consumed by these blocks will also vary for each possible combination of transmit parameters. Finally, some of these functional blocks may be duplicated in order to implement a MIMO scheme. The selected combination of transmit parameters, then, will ultimately affect the mobile terminal's battery life.

The overall power consumption $P_{tot}$ of the transmitter portion of a mobile transmitter during a transmission can be modeled by the following formula:

$$P_{tot}=P_0+P_1(R)+P_2(B)+P_{pa}(P_{out}).$$

$P_0$ is the contribution from support circuitry 450 that generally does not vary directly with bandwidth, modulation format, or transmit power level. Although the circuits that consume $P_0$ may be switched off between transmissions, $P_0$ is otherwise independent of the transmit parameters. Energy consumption from $P_0$ thus varies only with the duration of a data transmission.

$P_1$ is the contribution that depends on the information rate R, where R represents the bits that are being processed during each interval of time. Variations in power consumption due to changes in R may appear in the DAC circuitry 420 and in signal processing circuits 410, as a result of variations in clock speed, or if different logic blocks are required to support variations in R. Changes in modulation format, coding scheme, and allocated bandwidth all influence R, and thus $P_1$.

$P_2$ represents the contribution to power consumption that depends on the RF bandwidth of the transmitted signal. This contribution is primarily manifested in the DAC 420, as well as in the analog conditioning components 430.

Finally, $P_{pa}$ is the contribution from the power amplifier, which is determined by the efficiency of the power amplifier (PA) and the required transmit power level $P_{out}$ (i.e. the power of the transmitted radio wave). The efficiency of the PA depends, among other things, on the PA biasing, which in turn depends on the transmit power level and the modulation format. A modulation format with a higher PAPR (such as 16- or 64-QAM) requires a larger back-off (e.g. from the 1-dB compression point) in the PA to reduce spurious emissions; the larger back-off results in lower efficiency.

The required transmit power level depends primarily on propagation conditions, but also on other factors. For example, the choice of modulation format may affect the required transmit level because the minimum signal level required at the base station receiver varies with modulation format. So, the transmit power level will vary with propagation loss (caused by distance and shadowing), receiver sensitivity at the base station 110 (which may vary with modulation format), and any fading margin added to avoid outages.

Some of the preceding factors are controlled within the wireless communications system, for example, by base station 110, or are dictated by design choices; others are not. Propagation loss is determined by the relative position of the mobile terminal 100 and the base station 110, as well as the environmental conditions. This variable changes over time and cannot be controlled. The base station receiver sensitivity depends on applied modulation format. For example, 16-QAM has a higher $E_b/N_0$ requirement than QPSK for the same bit error rate. The choice of coding also affects the receiver sensitivity. Applying a simpler modulation format and coding reduces the required $P_{out}$ at the expense of a lower effective information rate and thus a longer transmission burst required to transmit the same number of information bits. A fading margin must generally be added to counteract dispersion in the channel. Diversity, which may include diversity achieved by increasing the RF bandwidth, reduces the fading margin required to achieve a given outage probability. A lower fading margin, in turn, reduces the required $P_{out}$.

Although the power amplifier power consumption is often quite large, the energy consumed by the power amplifier does not always dominate the total transmitter energy consumption. When the mobile terminal 100 is close to the base station 110, $P_{pa}$ may actually be relatively low compared to other components of the overall power consumption. In addition, because the efficiency of the power amplifier will vary with transmit power level, a fractional reduction in $P_{out}$ will not always result in the same fractional reduction of $P_{pa}$.

Much of the preceding discussion assumes that the mobile terminal 100 includes only one transmitter chain. If MIMO is employed for the uplink, several of the functional blocks illustrated in FIG. 4 may be duplicated for each transmitter. Thus, the particular MIMO scheme employed may have a dramatic effect on the power and energy consumption of the transmitter section of mobile terminal 100. To the extent that the MIMO scheme may be varied over time, the parameters defining the MIMO scheme, such as parameters defining precoding schemes, spatial multiplexing schemes, and/or diversity coding schemes, will also affect the power and energy consumption of the mobile terminal 100. These parameters will also interact with the other factors discussed above.

Thus, it will be clear to those skilled in the art that there are numerous factors that impact the mobile terminal's power consumption, and sometimes in non-obvious ways. A wider RF bandwidth may reduce $P_{pa}$ because of a lower fading margin, but it may increase $P_1$ because of higher power consumption in other parts of transmitter. If the mobile terminal 100 is close to the base station 110, then $P_{pa}$ is likely not the dominant term in the formula. In that event, reducing it may have a small impact on power consumption, whereas increasing the bandwidth may increase the total power consumption due to an increase in $P_1$.

The picture is even more complicated when considering the overall energy consumption resulting from data transmission, rather than just the instantaneous power consumption. If the choice of one or more of the transmit parameters affects the duration of transmission, then the effect on overall energy consumption may not directly correspond to the instantaneous power consumption. For example, given a fixed bandwidth, selecting a lower-order modulation scheme, perhaps with additional coding, may result in a lower required transmit power level. However, data throughput will suffer, so that additional transmission time intervals may be needed to transmit the same number of information bits. Especially because of the non-linear relationship between transmit power level and $P_{pa}$, the reduction in $P_{pa}$ may not make up for the increase in overall energy consumption arising from the extended transmission interval. However, in some circumstances, for example where the required transmit power level is already quite low, the trade-off may differ.

Importantly, in the LTE context, bandwidth is another variable which may be varied. As a result, the lower throughput resulting from the selection of a lower-order modulation scheme may be offset with the allocation of additional frequency blocks. Thus, addition of link resources in the form of extended transmit time may have a different impact on overall energy consumption than allocation of additional frequency blocks. These tradeoffs can be exploited to reduce mobile terminal energy consumption, particularly when the wireless system's capacity is underutilized.

In even more advanced systems, the advantages of increased data throughput and extended link range offered by MIMO technology may be weighed along with bandwidth allocations and modulation schemes. Although MIMO schemes may require additional transmitter components and/or functionality to be active, the resulting increases in energy consumption may be outweighed by improvements in throughput.

Of the several factors and parameters discussed above, two factors are uncontrolled by the system: propagation conditions (i.e. path loss) and required throughput. The former is determined by the physical environment, while the latter is determined by the mobile terminal user's application. The transmit parameters discussed above, namely bandwidth, modulation format, coding, MIMO parameters, and power level, are all controlled by the system, although each may be constrained by design limitations or capacity constraints. Ordinarily, these transmit parameters are selected to optimize system throughput. However, especially when the wireless system capacity is underutilized, an optimal combination of transmit parameters, in terms of reduced transmitter energy consumption, can be determined for any combination of path loss and required throughput.

The optimal combination of transmit parameters for a range of conditions may be calculated as needed, but may also be pre-calculated and stored in memory for later retrieval. A model is constructed for a particular mobile terminal design, or for an entire class of mobile terminals, to determine the power consumed for various combinations of path loss and throughput requirements. For each combination of path loss and throughput requirement, each of the various combinations of bandwidth allocation, modulation format, and coding is analyzed to determine the resulting transmit power level requirement as well as the impact on transmission time. If applicable, various combinations of MIMO schemes may be analyzed in conjunction with the other parameters. These parameters are then used with the model to determine the overall energy consumption for each possible selection of bandwidth allocation, modulation format and coding. Then, the combination resulting in the lowest energy consumption will be readily apparent. These optimal combinations may be stored, for example, in a lookup table indexed by path loss and throughput requirement, so that they are readily retrievable.

Figure 5:
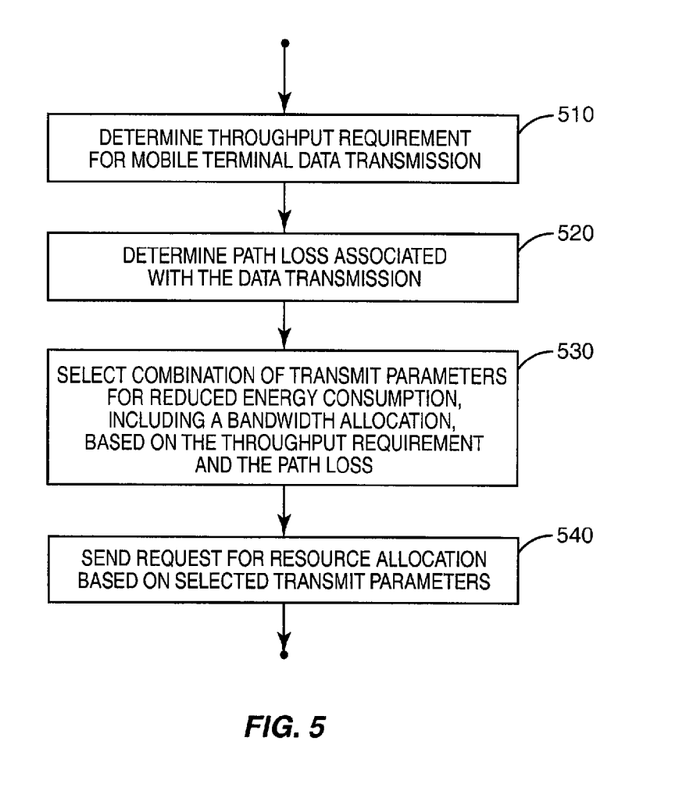
FIG. 5 is a flow diagram illustrating one embodiment for selecting transmit parameters for a mobile terminal.

FIG. 5 illustrates an exemplary method, which may be implemented at mobile terminal 100, for determining transmit parameters for data transmission by mobile terminal 100. With this method, a set of transmit parameters that reduces the overall energy consumption of the mobile terminal transmitter for a planned transmission may be selected, based on the current propagation conditions and the throughput requirements of the application(s) executing on mobile terminal 100.

At block 510, a throughput requirement is determined. For certain applications, such as a voice call or video conference, the throughput requirement is based on a minimum average data rate required to maintain an acceptable quality of service. In addition to average data rate, latency is also a factor in these real-time applications. However, these requirements can in general be cast as a throughput requirement, in that a certain number of bits must be transmitted in a certain interval of time. With a voice call or video conference, the total duration of the session is of course unknown a priori. Accordingly, a throughput requirement for a real-time application may be expressed as the number Y of bits required to be transmitted in the next Z time intervals.

A bulk transfer of data, such as for an upload of a camera image or video clip, will generally not require the same qualitative level of service as real-time applications such as video conferencing. Theoretically, the transmission of a data file could be spread over many—sub-frames in order to minimize overall energy consumption. Of course, the mobile terminal user's perception of the quality of the service provided will be influenced by the overall speed of file transfer. This perception will ultimately set a lower bound for the throughput requirement.

The size of the file to be transferred may influence the minimum throughput requirement. For many applications, transferring a file in a few seconds will appear to the user as virtually instantaneous. Thus, if the file is relatively small, the average throughput required to make the transfer appear fast may be relatively low. For larger files, the average throughput required to satisfy user expectations may be larger.

In either event, determining the throughput requirement for a bulk data transfer begins with determining the number of total bits to be transferred. An average rate may be computed as a function of the total number of bits, or a minimum throughput may be predetermined for certain applications, or for all bulk data transfers. In any event, a throughput requirement, such as that at least Y bits be transferred over the next Z time intervals, may be determined for bulk data transfers as well as for real-time applications.

At block 520, the path loss applicable to data transmissions from the mobile is determined. The path loss may be estimated by any or several of a variety of techniques known to those skilled in the art. For instance, mobile terminal 100 determines the path loss by measuring received signal power for downlink reference symbols, and compares the measured received power to the value of the transmitted power, which the mobile terminal 100 extracts from layer 3 messages received from the base station 110. Other propagation-related information, such as Doppler, power-delay profiles, etc., may be incorporated into the path loss determination process, to provide for an appropriate fading margin, or to compensate for mismatches between the uplink and downlink path losses.

At block 530, transmit parameters are selected based on the throughput requirement and the path loss determined at blocks 510 and 520, respectively. As discussed above, a lookup table, stored in memory of mobile terminal 100 and indexed by a throughput parameter and a path loss parameter, may have been constructed, with entries corresponding to a combination of transmit parameters designed to minimize, or at least reduce, transmitter energy consumption, for the given combination of path loss and throughput requirement. The entries in the lookup table may comprise a bandwidth allocation, perhaps in terms of the number of resource blocks needed, as well as a modulation format and coding scheme. Where applicable, the entries may also comprise parameters defining a MIMO scheme. A target transmit power level may also be retrieved from the lookup table, or the transmit power level may be calculated in light of the selected parameters.

At block 540, mobile station 100 sends a request for a resource allocation to the base station 110. The contents of this request are based on the transmit parameters selected at block 530. For example, the message sent to base station 110 may comprise a specific request for a certain number of resource blocks, as well as a specific modulation format and coding scheme. Alternatively, the request may indicate a range of resource allocations. In either case, the request is based on the selected transmit parameters, which are designed to minimize the energy consumed by the mobile terminal transmitter.

In response to the request for resource allocation, base station 100 (or other associated network node) determines a schedule for allocation of uplink resources to mobile station 100. If capacity is constrained, this schedule may not be able to accommodate the request, i.e. a less efficient allocation of resources may be required. However, in many circumstances, particularly when the network is lightly loaded, matching the schedule to the resource request is possible. In either event, a message indicating the allocated resources, modulation formats, etc., may then be sent to the mobile terminal 100. This message determines the transmitter settings used by mobile terminal 100 in the subsequent data transmission.

Figure 6:
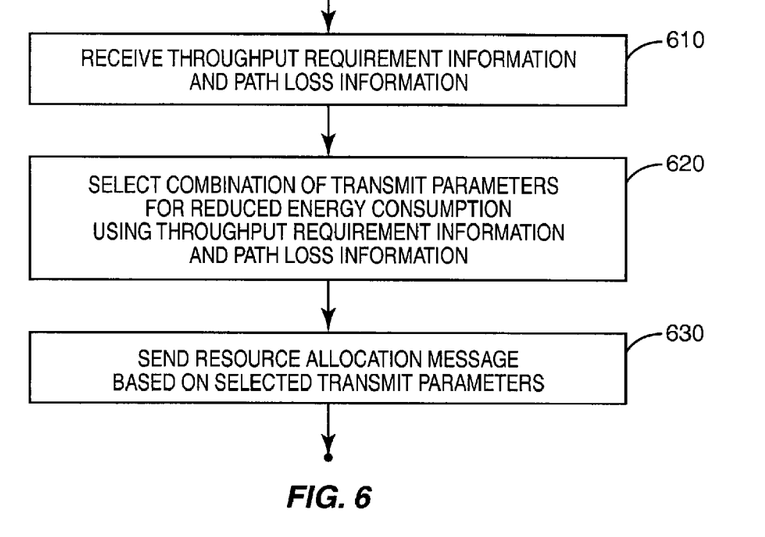
FIG. 6 is a flow diagram illustrating an exemplary method implemented at a network node.

FIG. 6 illustrates a variation of the above method that may be implemented at the base station 110 or other node in the wireless communications system, such as the Node B or RNC of an LTE system. Performing the method on the fixed side of the network may in some circumstances make it more convenient to account for the resource needs of other mobile stations in evaluating the trade-offs between network capacity and energy-efficient allocation of resources.

In the initial description of FIG. 5 above, the determination of the throughput requirement was performed in the mobile terminal 100. This is often convenient, since the throughput requirement is driven by user application(s) active at mobile terminal 100. In some embodiments of the present invention, such as the method depicted in FIG. 6, the throughput requirement may be determined at another node in the wireless communications system, such as a Node B in an LTE system. Thus, information relating to the throughput requirement may be sent to the node. For instance, mobile terminal 100 may send a message to base station 110 that includes an explicit minimum throughput requirement. Alternatively, the message may indicate the application and/or a desired quality of service, so that the fixed node can determine the actual throughput requirement. In the case of a bulk transfer of data, the message may simply indicate the amount of data to be transferred.

As with the throughput requirement determination, determination of the path loss is generally performed by mobile terminal 100. Again, however, the path loss may be determined at another network node, such as a Node B. Accordingly, mobile terminal 100 may transmit explicit path loss data, or information related to path loss, such as received signal strength measurement data, to the Node B, so that the path loss is actually calculated in the fixed part of the wireless communications system.

Thus, at block 610 of FIG. 6, throughput requirement information and path loss information are received at the network node, such as base station 110. This information may be received in one or more messages sent from the mobile station 100, and may include an explicit throughput requirement and an explicit path loss parameter, or it may include information from which the network node may calculate a throughput requirement and a path loss parameter.

At block 620, the network node selects transmit parameters for the mobile terminal 100, in view of the throughput requirement information and path loss information, that are designed to minimize transmitter energy consumption at the mobile terminal 100. As before, this selection may comprise retrieving parameters from a lookup table constructed from a model of the mobile terminal 100, or, perhaps, a more general model applicable to a class of mobile terminals.

The network node may then send a resource allocation message to the mobile terminal 100, as pictured at block 630, basing the link resource allocation on the selected transmit parameters. This resource allocation message may comprise a schedule for transmissions by the mobile terminal 100, including allocation of resource blocks (in time and frequency) and specifying one or more modulation formats and coding schemes. As previously discussed, it may be impossible or impractical to perfectly match this resource allocation to the selected transmit parameters, especially if the network is heavily loaded. In this case, an allocation of resources that may result in less efficient energy use at the mobile terminal 100 may be necessary. However, in many circumstances, particularly when the network is lightly loaded, matching the schedule to the resource request is possible.

In yet another variation of the above methods, selection of transmit parameters is based not only on the throughput requirement and path loss associated with mobile terminal 100, but also takes into account resource requests from other mobile terminals. Using this approach, capacity constraints of the network are more directly accounted for in the selection of transmit parameters.

Figure 7:
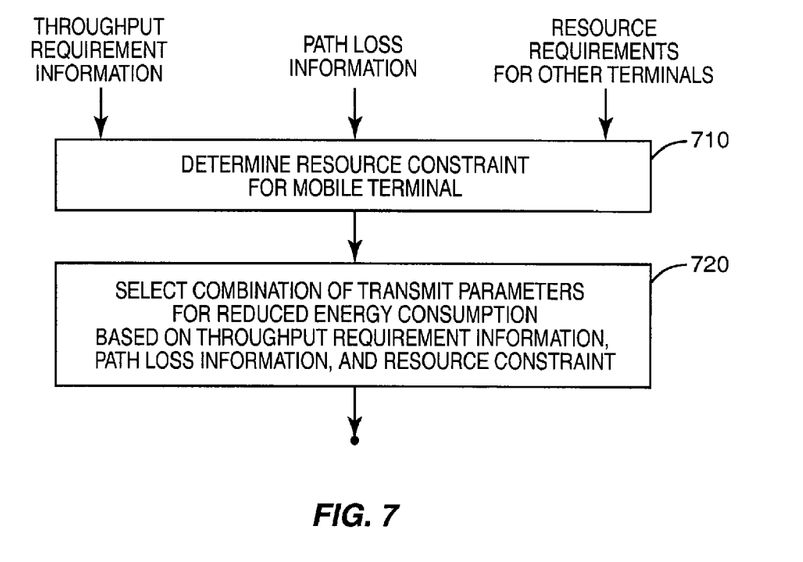
FIG. 7 is a flow diagram illustrating an alternative method for selecting transmit parameters for a mobile terminal.

FIG. 7 illustrates an embodiment of this approach. As with the previously discussed methods, a throughput requirement and path loss are determined for mobile terminal 100. In addition, resource allocation requirements associated with one or more other additional mobile terminals are collected. This information is evaluated at block 710 to determine a resource constraint for mobile terminal 100. The resource constraint is then used at block 720, along with the throughput requirement and the path loss information, to select transmit parameters for mobile terminal 100. As before, these selected transmit parameters are designed to reduce energy consumption at mobile terminal 100.

The resource constraint can be determined in a variety of ways. For example, resources, such as resource blocks, may be divided evenly between mobile terminals. Alternatively, resource blocks may be divided based on the throughput requirements of the various applications running on the mobile terminals. Additional "fairness" criteria may be factored into the resource constraint as well.

In any event, the transmit parameters for mobile terminal 100 are selected at block 720, using the resource constraint as well as the throughput requirement and path loss information for mobile terminal 100. Although the resource constraint adds an additional limitation to the transmit parameter selection, the selected parameters are still designed to minimize energy consumption at mobile terminal 100, given the current circumstances.

Regardless of the method used for initially determining transmit parameters for mobile terminal 100, the transmit parameters may be periodically updated to account for changing conditions. These changing conditions may include changes in signal propagation conditions, as well as changes in the throughput requirements of the mobile. This process is similar to conventional link adaptation processes, but the adapted transmit parameters (such as bandwidth allocation, modulation format, and coding format) are selected to reduce energy consumption at the mobile terminal, rather than simply to maximize network throughput.

Figure 8:
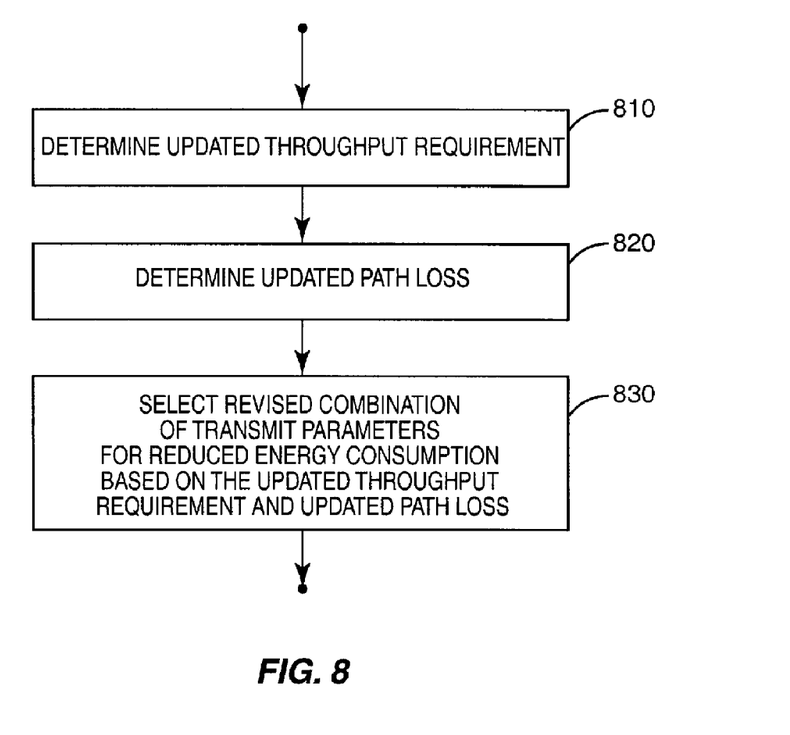
FIG. 8 is a flow diagram illustrating the updating of transmit parameters based on changed conditions.

FIG. 8 illustrates an exemplary method for revising transmit parameters for a mobile terminal based on an updated throughput requirement and an updated path loss. At block 810, an updated throughput requirement is determined. The throughput requirement may change because of changes in the applications running on the mobile terminal 100. In general, the updated throughput requirement is determined in the same manner as the initial throughput requirement was determined, but using current information.

At block 820, an updated path loss is determined. As the mobile terminal 100 moves around, signal propagation conditions will vary, sometimes dramatically. As a result, the path loss must be monitored and updated frequently.

At block 830, a revised combination of transmit parameters is selected based on the updated throughput requirement and the updated path loss. As before, the revised transmit parameters are designed to reduce energy consumption by the mobile terminal 100.

Not all transmit parameters must be revised at each update interval. Under many circumstances, only the transmit power level need be adjusted to maintain a minimum packet error rate and/or bit error rate given the signal propagation conditions. Under other circumstances, however, the changes to either or both of the throughput requirement and the path loss will be such that changes to the bandwidth allocation or modulation format may be desirable to minimize overall energy consumption at the mobile terminal 100.

In yet another embodiment of the present invention, the resource allocation message sent to mobile terminal 100 comprises a parameter that represents a limit, rather than a fixed transmit parameter. Upon receiving this resource allocation message, mobile terminal 100 selects a particular transmitter setting to use for a data transmission from a range of settings bounded by the limit. This approach may be particularly useful when the system is lightly loaded.

In this embodiment, the resource allocation message specifies, for example, a maximum bandwidth allocation, or a range of modulation schemes, or both. Upon receipt of this limit or limits, mobile terminal 100 determines precisely which of the several permitted bandwidths or modulation schemes to use for a given transmission. This approach provides mobile terminal 100 with more autonomy to make detailed tradeoffs between throughput and energy savings.

This approach also permits mobile terminal 100 to adjust link resource usage between successive transmissions with fewer messages exchanged between mobile terminal 100 and base station 110. Once a resource allocation message comprising one or more limiting parameters has been received, mobile terminal 100 adjusts the transmit settings from burst to burst in order to minimize overall energy conditions. Until conditions change, a new request for a resource allocation may be unnecessary. Once conditions have changed, for example, if the propagation loss changes significantly, or if the throughput needs of applications running on mobile terminal 100 change, then a new set of transmit parameters may be selected, and a new request for resource allocation may be sent.

Those skilled in the art will recognize that if mobile terminal 100 is provided with autonomy to choose the transmit settings actually used, then base station 110 must have a means for determining which settings were actually used. This can be done in several ways. For example, base station 110 can be provided with circuitry for determining the selected transmit parameters from the received signal characteristics. If mobile terminal 100 chooses to use less than the maximum allocated bandwidth, for example, the vacant bandwidth is detected at base station 110 by comparing signal energy received in each bandwidth slot. If mobile terminal 100 is provided a choice of which modulation scheme to employ, base station 110 can be provided with circuitry to detect which scheme is used, perhaps by simultaneously demodulating the received signal with several demodulators and examining the results to determine which approach yielded properly decoded bits.

Alternatively, each transmission from mobile terminal 100 may include header information, transmitted at a predictable frequency location and using a predictable modulation scheme. This header information, which is readily decoded by base station 110, includes information indicating precisely which transmitter settings were used by mobile terminal 100. The header information may be transmitted using a different modulation scheme than used for payload data.

Although the various methods described above have primarily been discussed in reference to transmit parameters associated with mobile terminal 100, these methods may also be applied to select transmit parameters for base station 110, with a view towards minimizing energy consumption at mobile terminal 100.

First, those skilled in the art will appreciate that the power consumption of the receiver portion of mobile terminal 100 will vary depending on the transmit parameters employed on the downlink (forward link). In the simplest case, given a fixed bandwidth, the selection of QPSK modulation will require a transmission burst four times longer than if 16-QAM is used. As a result, certain receiver circuitry, which would otherwise be powered down, will be active for four times as long. Other parameter selections for the downlink, including bandwidth, information rate, coding scheme, MIMO parameters, etc., will also have an impact on the overall receiver energy consumption at mobile terminal 100, directly analogous to the effects discussed above for the transmitter section of mobile terminal 100.

Thus, in one or more embodiments of the present invention, base station 110 is configured to determine a throughput requirement for downlink transmissions to mobile terminal 100, to determine path loss information for the downlink, and to select a combination of transmit parameters using the throughput requirement and the path loss information, the combination of transmit parameters designed to reduce the energy consumption at the receiver of mobile terminal 100. Although minimizing the receiver energy consumption may not be practical under all circumstances, particularly when the wireless system is heavily loaded, transmit parameters for the downlink may generally be selected with a view towards energy consumption at the mobile receiver.

Figure 9:
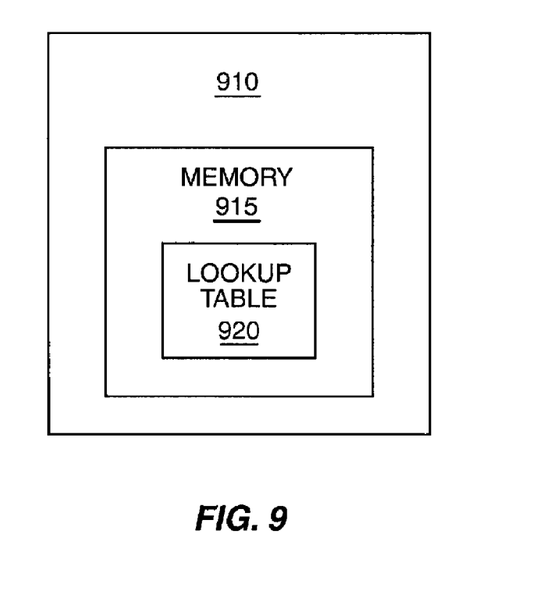
FIG. 9 is a block diagram illustrating one embodiment of a processing circuit for selecting transmit parameters for a mobile terminal.

The methods described above may be implemented in a processing circuit 910, as illustrated in FIG. 9. Processing circuit 910 may be installed in mobile terminal 100, or in another network node of the wireless communications system, such as a Node B. As will be readily understood by those skilled in the art, processing circuit 910 may be implemented using digital hardware, microprocessors running software, or a combination of both. Processing circuit 910 may comprise specialized or general-purpose processors, or digital signal processors (DSP), or one or more of each.

Processing circuit 910 comprises a memory circuit 915, which includes a lookup table 920 indexed by values corresponding to a throughput requirement and a path loss. Processing circuit 910 is configured to select a combination of transmit parameters for mobile terminal 100 by retrieving the appropriate combination of transmit parameters from the lookup table 920 using index values corresponding to the throughput requirement and path loss.

When processing circuit 910 is installed in mobile terminal 100, it may be further configured to send a request for an allocation of resources based on the combination of transmit parameters. This message will be sent using message formats and protocols specific to the wireless communications system configuration. For example, in an LTE system the format and protocol for this message will be defined by appropriate 3GPP standards.

When processing circuit 910 is installed in a network node such as a Node B of an LTE system, it may be further configured to send a resource allocation message to a mobile terminal 100. The contents of this resource allocation message, as discussed above, are based upon the combination of transmit parameters selected by the processing circuit 910 for the mobile terminal 100.

Depending on where it is installed, processing circuit 910 will also include or be combined with additional baseband processing circuits carrying out other functions of the mobile terminal 100 or network node. In particular, processing circuit 910 may comprise or be combined with circuits configured to measure path loss information, and/or to interface with user applications to determine throughput requirements. Processing circuit 910 may further be combined with wireless receiver and transmitter circuitry to provide a complete transceiver device. This transceiver device may be configured as a portable, end-user terminal, such as a cellular radiotelephone, or as a fixed communications device.

With these and other variations and extensions in mind, those skilled in the art will appreciate that the foregoing description and the accompanying drawings represent non-limiting examples of the methods and apparatus taught herein for determining transmit parameters for a data transmission by a mobile station in a wireless communications system. As such, the present invention is not limited by the foregoing description and accompanying drawings. Instead, the present invention is limited only by the following claims and their legal equivalents.

What is claimed is:

1. A method of determining transmit parameters for a data transmission between a mobile terminal and a network node in a wireless communication system, comprising:
   determining a throughput requirement and a path loss associated with the data transmission; and
   selecting, based on the throughput requirement and the path loss, a combination of transmit parameters designed to minimize the total energy consumed by the mobile terminal during the data transmission, wherein the combination of transmit parameters includes an allocation of an amount of frequency bandwidth.

2. The method of claim 1, wherein the data transmission is a data transmission from the mobile terminal to the network node, and further comprising sending, to the network node, a request for an allocation of link resources based on the selected combination of transmit parameters.

3. The method of claim 2, further comprising receiving a resource allocation message in response to the request and determining one or more transmitter settings from the resource allocation message.

4. The method of claim 3, wherein the resource allocation message comprises a limiting parameter, and wherein determining one or more transmitter settings from the resource allocation message comprises choosing one of the transmitter settings from a range of settings bounded by the limiting parameter.

5. The method of claim 1, wherein the data transmission is a data transmission from the network node to the mobile station, and further comprising allocating link resources based on the transmit parameters.

6. The method of claim 1, wherein the combination of transmit parameters further includes a transmit power setting.

7. The method of claim 1, wherein the combination of transmit parameters further includes a modulation format and a coding scheme.

8. The method of claim 1, wherein the allocation of an amount of frequency bandwidth corresponds to a number of sub-carriers of an OFDM signal.

9. The method of claim 1, wherein the allocation of an amount of frequency bandwidth corresponds to a number of resource blocks in a single-carrier FDMA signal.

10. The method of claim 1, wherein the combination of transmit parameters further includes one or more parameters related to a multiple-antenna transmit scheme.

11. The method of claim 1, wherein the method is implemented at the network node, wherein determining a throughput requirement and a path loss associated with the data transmission comprises receiving a message from a mobile terminal, the message comprising throughput requirement information and path loss information.

12. The method of claim 11, wherein selecting a combination of transmit parameters is further based on link resource requirements associated with one or more additional mobile terminals.

13. The method of claim 1, further comprising:
   determining an updated throughput requirement for the mobile terminal;
   determining an updated path loss for the mobile terminal; and
   selecting a revised combination of transmit parameters based on the updated throughput requirement and the updated path loss.

14. The method of claim 13, wherein the revised combination of transmit parameters includes a revised bandwidth allocation.

15. The method of claim 13, wherein the combination of transmit parameters includes a first transmit power setting and wherein the revised combination of transmit parameters includes a second transmit power setting that differs from the first transmit power setting.

16. The method of claim 13, wherein the combination of transmit parameters includes a first modulation format and a first coding scheme and wherein the revised combination of transmit parameters includes a second modulation format differing from the first modulation format or a second coding scheme differing from the first coding scheme, or both.

17. The method of claim 13, wherein the combination of transmit parameters includes one or more parameters related to a multiple-antenna transmit scheme, and wherein the revised combination of transmit parameters includes one or more changes to the one or more parameters related to the multiple-antenna transmit scheme.

18. A processing circuit for use in a node of a wireless communications system, the processing circuit configured to:
   determine a throughput requirement and a path loss associated with a data transmission between a mobile terminal and a network node; and
   select, based on the throughput requirement and the path loss, a combination of transmit parameters designed to minimize the total energy consumed by the mobile terminal during the data transmission, wherein the combination of transmit parameters includes an allocation of an amount of frequency bandwidth.

19. The processing circuit of claim 18, wherein the processing circuit comprises a memory configured with a lookup table indexed by values corresponding to the throughput requirement and the path loss, wherein the processing circuit is configured to select a combination of transmit parameters by retrieving the combination of transmit parameters from the lookup table using the values.

20. A mobile terminal including the processing circuit of claim 18, wherein the processing circuit is further configured to send a request for an allocation of resources in the wireless communication system based on the combination of transmit parameters.

21. The mobile terminal of claim 20, wherein the processing circuit is further configured to receive a resource allocation message in response to the request, the resource allocation message comprising at least one limiting parameter, and wherein the processing circuit is further configured to choose a transmitter setting from a range of settings bounded by the limiting parameter.

22. A network node including the processing circuit of claim 18, wherein the processing circuit is further configured to send to the mobile terminal a resource allocation message based on the selected combination of transmit parameters.

* * * * *

UNITED STATES PATENT AND TRADEMARK OFFICE
CERTIFICATE OF CORRECTION

PATENT NO. : 8,103,302 B2
APPLICATION NO. : 11/853068
DATED : January 24, 2012
INVENTOR(S) : Haartsen et al.

It is certified that error appears in the above-identified patent and that said Letters Patent is hereby corrected as shown below:

On Title Page 2, Item (56), under "OTHER PUBLICATIONS", Line 22,
delete "25.814 V7.1.0(Sep. 2006)." and insert -- 25.814 V7.1.0 (Sep. 2006). --, therefor.

In Column 1, Line 35, delete "Transmission,"" and insert -- Transmission", --, therefor.

In Column 3, Line 30, delete "station" and insert -- terminal --, therefor.

In Column 8, Line 65, delete "station" and insert -- terminal --, therefor.

In Column 9, Line 10, delete "100" and insert -- 110 --, therefor.

In Column 9, Line 11, delete "station" and insert -- terminal --, therefor.

In Column 9, Lines 26-27, delete "stations" and insert -- terminals --, therefor.

In Column 9, Line 58, delete "station" and insert -- terminal --, therefor.

In Column 13, Line 29, delete "station" and insert -- terminal --, therefor.

In Column 13, Line 64, in Claim 5, delete "station," and insert -- terminal, --, therefor.

Signed and Sealed this
Twelfth Day of February, 2013

Teresa Stanek Rea
*Acting Director of the United States Patent and Trademark Office*